(12) United States Patent
Abe et al.

(10) Patent No.: US 7,299,183 B2
(45) Date of Patent: Nov. 20, 2007

(54) CLOSED CAPTION SIGNAL PROCESSING APPARATUS AND METHOD

(75) Inventors: Kazuhiko Abe, Yokohama (JP); Yasuyuki Masai, Yokohama (JP); Makoto Yajima, Tachikawa (JP); Kohei Momosaki, Kawasaki (JP); Koichi Yamamoto, Kawasaki (JP); Munehiko Sasajima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 470 days.

(21) Appl. No.: 10/899,007

(22) Filed: Jul. 27, 2004

(65) Prior Publication Data

US 2005/0060145 A1    Mar. 17, 2005

(30) Foreign Application Priority Data

Jul. 28, 2003   (JP) ............................. 2003-202554

(51) Int. Cl.
 *G10L 11/00* (2006.01)
 *H04N 5/91* (2006.01)

(52) U.S. Cl. ....................................... 704/270; 386/95

(58) Field of Classification Search ................ None
 See application file for complete search history.

(56) References Cited

U.S. PATENT DOCUMENTS

| 5,649,060 | A | * | 7/1997 | Ellozy et al. ............... 704/278 |
| 5,703,655 | A | * | 12/1997 | Corey et al. ............... 348/468 |
| 5,741,136 | A | * | 4/1998 | Kirksey et al. ............. 434/169 |
| 6,076,059 | A | * | 6/2000 | Glickman et al. .......... 704/260 |
| 6,442,518 | B1 | * | 8/2002 | Van Thong et al. ........ 704/235 |
| 7,054,804 | B2 | * | 5/2006 | Gonzales et al. ............... 704/8 |
| 7,117,231 | B2 | * | 10/2006 | Fischer et al. .............. 707/203 |
| 2004/0093220 | A1 | * | 5/2004 | Kirby et al. ................ 704/278 |

FOREIGN PATENT DOCUMENTS

| JP | 10-40260 | 2/1998 |
| JP | 11-234611 | 8/1999 |
| JP | 2000-324395 | 11/2000 |
| JP | 2002-10222 | 1/2002 |
| JP | 2002-351490 | 12/2002 |

OTHER PUBLICATIONS

Kim et al., "Content-Based News Video Retrieval with Closed Captions and Time Alignment", Proceedings of the Second IEEE Pacific Rim Conference on Multimedia: Advances in Multimedia Information Processing, Lecture Notes In Computer Science, vol. 2195, pp. 879-884, 2001.*

* cited by examiner

*Primary Examiner*—David Hudspeth
*Assistant Examiner*—Brian L. Albertalli
(74) *Attorney, Agent, or Firm*—Oblon, Spivak, McClelland, Maier & Neustadt, P.C.

(57) ABSTRACT

A closed caption signal processing apparatus comprises a speech recognition unit to recognize speech contents from the speech signal, a speech timing detecting unit to detect a speech timing of the speech contents, a closed caption contents acquisition unit to acquire closed caption contents from the closed caption signal associated with the speech signal, a presentation timing detecting unit to detect a presentation timing of the closed caption contents, an agreement detecting unit to detect an agreement between the speech contents and the closed caption contents, and a time difference calculating unit to calculate a time difference between the speech timing and the presentation timing that are detected on the speech contents and the closed caption contents that agree with each other, respectively.

18 Claims, 5 Drawing Sheets

CLOSED CAPTION SIGNAL PROCESSING APPARATUS AND METHOD

CROSS-REFERENCE TO RELATED APPLICATIONS

This application is based upon and claims the benefit of priority from prior Japanese Patent Application No. 2003-202554, filed Jul. 28, 2003, the entire contents of which are incorporated herein by reference.

BACKGROUND OF THE INVENTION

1. Field of the Invention

The present invention relates to a closed caption signal processing apparatus which outputs a speech and a closed caption based on a speech signal and a closed caption signal which express contents corresponding to each other, and a method therefor.

2. Description of the Related Art

Closed caption information is sent by a television broadcasting radio signal. However, the closed caption information does not always coincide with the speech signal. Particularly, when the closed caption is made up at a real time in the broadcasting station, the closed caption information may delay by 5 to 10 seconds with respect to the speech signal. Accordingly, when the television broadcasting radio signal is received with a television receiver, the closed caption is not displayed at the same timing as a speech. This makes a TV viewer to be hard to watch TV programming. It is desired that the closed caption is displayed at the same timing as the speech.

The object of the present invention is to provide a closed caption signal processing apparatus to detect a timing deviation between utterance and display of the closed caption, and compensate the deviation, and a method therefor.

BRIEF SUMMARY OF THE INVENTION

An aspect of the present invention provides a closed caption signal processing apparatus using a speech signal and a closed caption signal, the apparatus comprising: a speech recognition unit configured to recognize speech contents from the speech signal; a speech timing detecting unit configured to detect a speech timing of the speech contents; a closed caption contents acquisition unit configured to acquire closed caption contents from the closed caption signal associated with the speech signal; a presentation timing detecting unit configured to detect a presentation timing of the closed caption contents; an agreement detecting unit configured to detect an agreement between the speech contents and the closed caption contents; and a time difference calculating unit configured to calculate a time difference between the speech timing and the presentation timing that are detected on the speech contents and the closed caption contents that agree with each other, respectively.

Another aspect of the present invention provides a method for processing a closed caption signal, comprising: recognizing speech contents from a speech signal; detecting a speech timing of the speech contents; deriving closed caption contents from a closed caption signal associated with the speech signal; detecting a presentation timing of the closed caption contents; detecting agreement between the speech contents and the closed caption contents; calculating a time difference between the speech timing and the presentation timing that are detected on the speech contents and the closed caption contents that agree with each other, respectively.

DETAILED DESCRIPTION OF THE INVENTION

There will now be described one embodiment of the present invention referring to the drawing.

Figure 1:
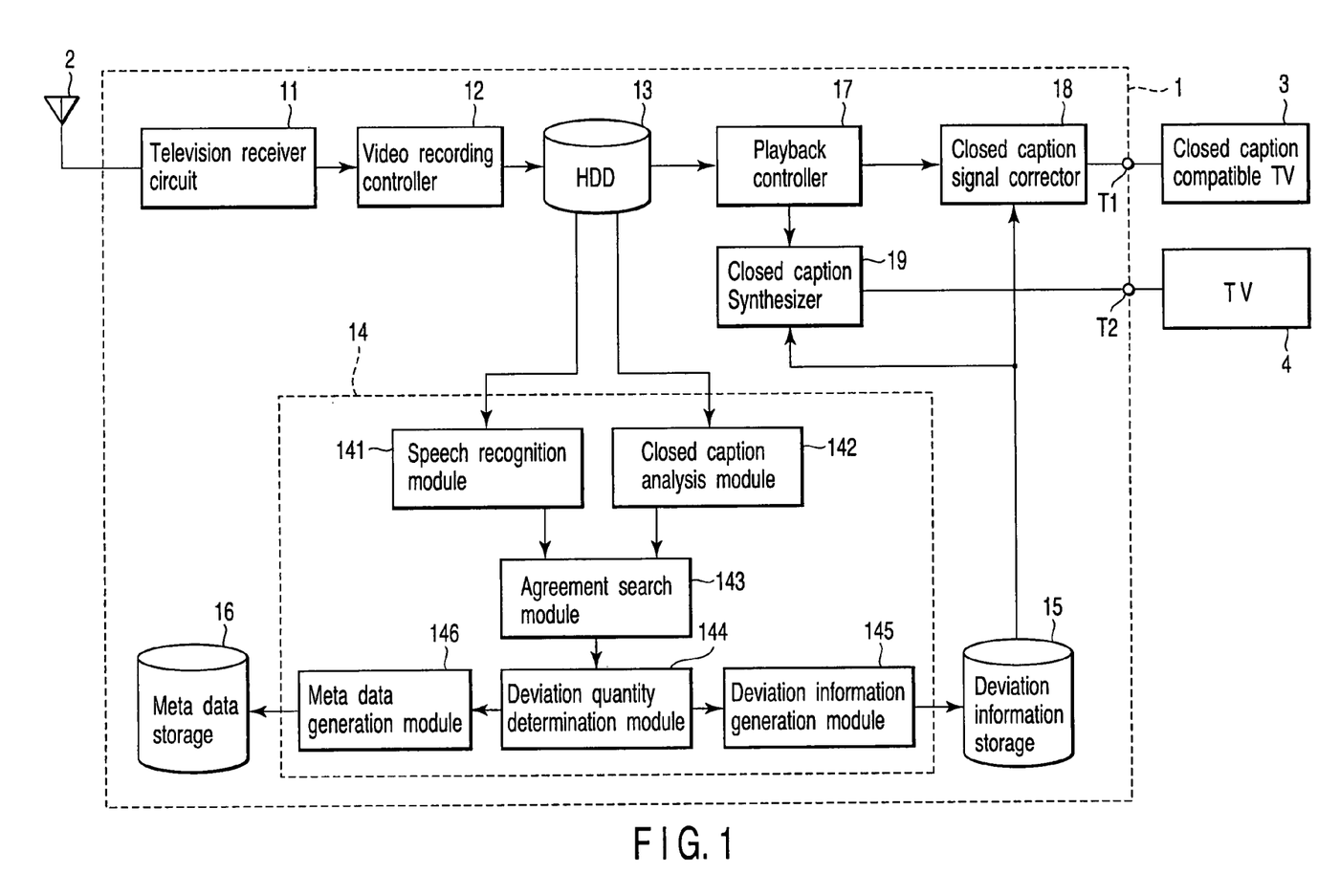
FIG. 1 is a block diagram illustrating a configuration of a hard disk recorder related to an embodiment of the present invention.

FIG. 1 is a block diagram illustrating a configuration of a hard disk recorder (referred to as HDD recorder) 1 related to the present embodiment.

The HDD recorder 1 includes a television receiver circuit 11, a video recording controller 12, a hard disk drive (referred to as HDD) 13, a closed caption deviation quantity determination unit 14, a deviation information storage unit 15, a meta data memory 16, a playback controller 17, a closed caption signal correction unit 18 and a closed caption synthesizer 19.

The television receiver circuit 11 receives a television broadcasting through an antenna 2. The television broadcasting to be received by the HDD recorder 1 may be any system, but assumes an NTSC system here. Accordingly, the television receiver circuit 11 outputs a signal based on the NTSC system (referred to as NTSC signal).

The video recording controller 12 subjects video information and audio information of a baseband signal output from the television receiver circuit 11 to a compression process according to a given format and writes it in the HDD 13. The video recording controller 12 extracts closed caption information multiplexed in the vertical blanking interval of the NTSC signal and writes it in the HDD 13.

The closed caption deviation quantity determination unit 14 includes a speech recognition module 141, a closed caption analysis module 142, an agreement search module 143, a deviation quantity determination module 144, a deviation information generation module 145, and a meta data generation module 146.

This closed caption deviation quantity determination module 14 can be configured mainly by a processor, for example. The speech recognition module 141, closed caption analysis module 142, agreement search module 143, deviation quantity determination module 144, deviation information generation module 145, and meta data generation module 146 can be realized by causing a processor to execute a program. In this time, the closed caption deviation quantity determination module 14 may be realized by a program installed in a built-in memory (not shown). Alternatively, it may be realized by a program stored in a removable recording medium such as a compact disk-read only memory, or a program distributed through a network and installed in the memory (not shown) included in the closed caption deviation quality determination module 14.

The speech recognition module 141 subjects the speech information stored in the HDD 13 to speech recognition to derive speech contents (notation data, pronunciation data and various morpheme information), and speech timing information indicating a timing at which the speech contents are uttered.

The closed caption analysis module 142 decodes the closed caption information stored in the HDD 13 to derive text data indicating a character string of the closed caption. The closed caption analysis module 142 derives presentation timing information representing a presentation timing of the closed caption. The closed caption analysis module 142 subjects the text data to a morphological analysis to read each morpheme included in the text data and derive part-of-speech information.

The agreement search module 143 searches for an agreement between speech contents derived by the speech recognition module 141 and the text data derived by the closed caption analysis module 142. The agreement search module 143 outputs text data agreed with the speech contents, presentation timing information of the text data, and speech timing information of the speech contents agreed with the text data to the deviation quality determination unit 144.

The deviation quantity determination unit 144 determines a deviation quantity of a presentation timing with respect to the text data output from the agreement search module 143 as a time difference between the timings indicated respectively by the speech timing information and presentation timing information which are supplied at the same time. The deviation quantity determination module 144 outputs the determined deviation quantity along with the text data and presentation timing information to the deviation information generation module 145 and the meta data generation module 146.

The deviation information generation module 145 generates the deviation information that made it reflect the deviation quantity output from the deviation quantity determination module 144, and write the deviation information in the information storage unit 15.

When the text data output from the deviation quantity determination module 144 matches a given meta registration condition, the meta data generation module 146 generates meta data which reflects the deviation quantity output from the deviation quantity determination module 144, and write the meta data in the meta data memory 16.

It is desirable that the deviation information storage unit 15 has a high capacity and is easy to access. It comprises, for example, a semiconductor memory or HDD. The deviation information storage unit 15 stores deviation information.

It is desirable that the meta data storage unit 16 has a high capacity and is easy to access. It comprises, for example, a semiconductor memory or HDD. The meta data storage unit 16 stores meta data.

The playback controller 17 reads video information, speech information and closed caption information which are stored in the HDD 13, and plays back an NTSC signal or AV signal which indicates these information. The playback controller 17 outputs a baseband signal to the closed caption signal correction unit 18, and outputs a video signal and closed caption information of the AV signal to the closed caption synthesis unit 19.

The closed caption signal correction unit 18 corrects the closed caption information included in the NTSC signal output from the playback controller 17 referring to the deviation information stored in the information storage unit 15. The NTSC signal from the closed caption signal correction unit 18 is sent via an NTSC terminal T1 to the outside of the HDD recorder 1. A television set (referred to as a closed caption broadcast compatible television) compatible with the closed-caption broadcasting, for example, is connected to the NTSC terminal T1.

The closed caption synthesis unit 19 synthesizes the closed caption according to the closed caption information output from the playback controller 17 with the video signal output from the playback controller 17. In this time, the closed caption synthesis unit 19 can shift a synthesis timing of closed caption information with respect to the video signal referring to the deviation information stored in the deviation information storage unit 15. The video signal from the closed caption synthesis unit 19 is output via a video terminal T2 to the outside of the HDD recorder 1. For example, a television receiver 4 with an AV terminal is connected to the video terminal T2.

Figure 2:
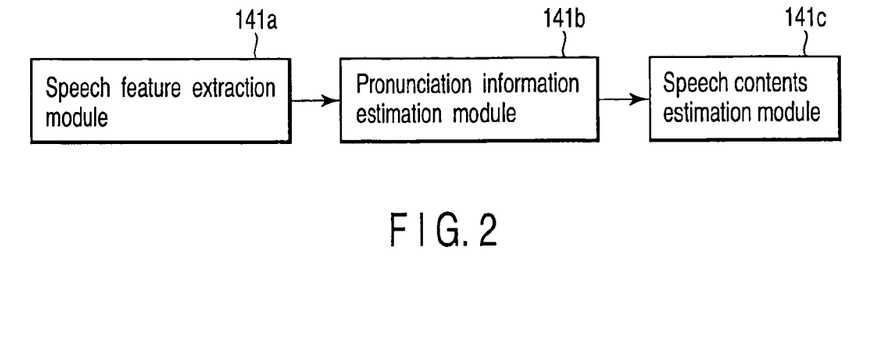
FIG. 2 is a block diagram illustrating an internal structure of a speech recognition unit 141 during FIG. 1.

FIG. 2 is a block diagram illustrating an internal structure of the speech recognition module 141. The speech recognition unit 141 includes a speech feature extraction module 141a, a pronunciation information estimation module 141b, and a speech contents estimation module 141c.

The speech recognition module 141 extracts a characteristic quality inherent to a speech from a speech signal with the speech feature extraction module 141a. The speech recognition module 141 compares the characteristic quantity with a model of the speech prepared beforehand by means of the pronunciation information estimation module 141b to estimate pronunciation information. Further, the speech recognition unit 141 estimates speech contents with linguistic meaning based on the pronunciation information by means of the speech contents estimation module 141c. A difference between kannji character notation and hiragana character notation, a homonym, and a recognition candidate are acquired at the same time, and output as a speech recognition result.

The operation of the HDD recorder 1 configured as above will be described hereinafter. The operation for normal video recording and playback is omitted since it is similar to that of a conventional record-playback machine. The operation concerning a process of the closed caption will be described in detail hereinafter.

This HDD recorder 1 records a broadcasted program on HDD 13, once, and then plays back the recorded program at an arbitrary timing required by a user or at a substantially real time.

In this time, if the program recorded on the HDD 13 has closed caption information, the closed caption deviation quantity determination unit 14 generates deviation information and meta data referring to the closed caption information and video information as follows.

Figure 3:
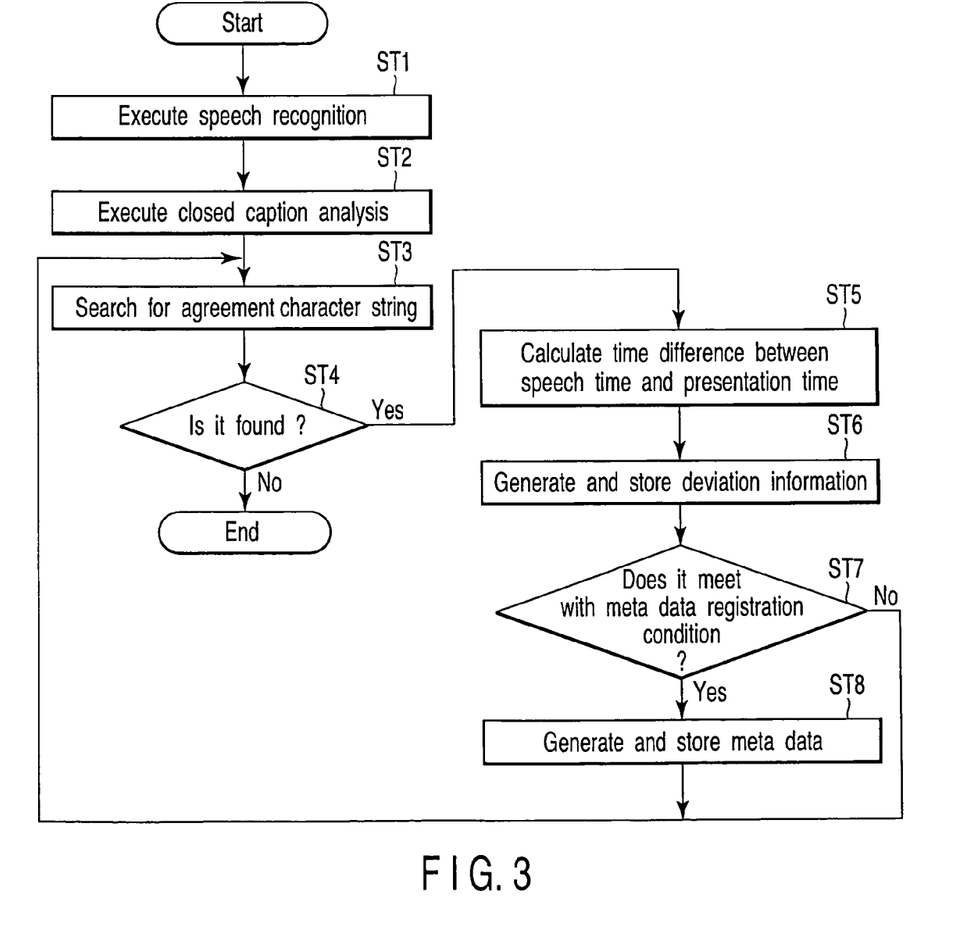
FIG. 3 is a flowchart of a process of a closed caption deviation quality determination unit 14 of FIG. 1.

FIG. 3 shows a flowchart of a process executed by the closed caption deviation quantity determination unit 14. The speech recognition module 141 subjects the speech information stored in the HDD 13 to speech recognition to derive speech contents and speech timing information indicating a speech timing at which the speech contents are uttered. The speech recognition module 141 derives notation data and pronunciation data for the speech contents. The speech recognition module 141 takes a correlation time using, for example, the head of the program as a reference time to be speech timing information.

If information such as a time code indicating the absolute position of a speech signal is added to the speech signal, this information can be used as speech timing information. The speech contents of one of a series of speeches may be delimited at an arbitrary level. However, in this embodiment, it is delimited every morpheme.

Figure 4:
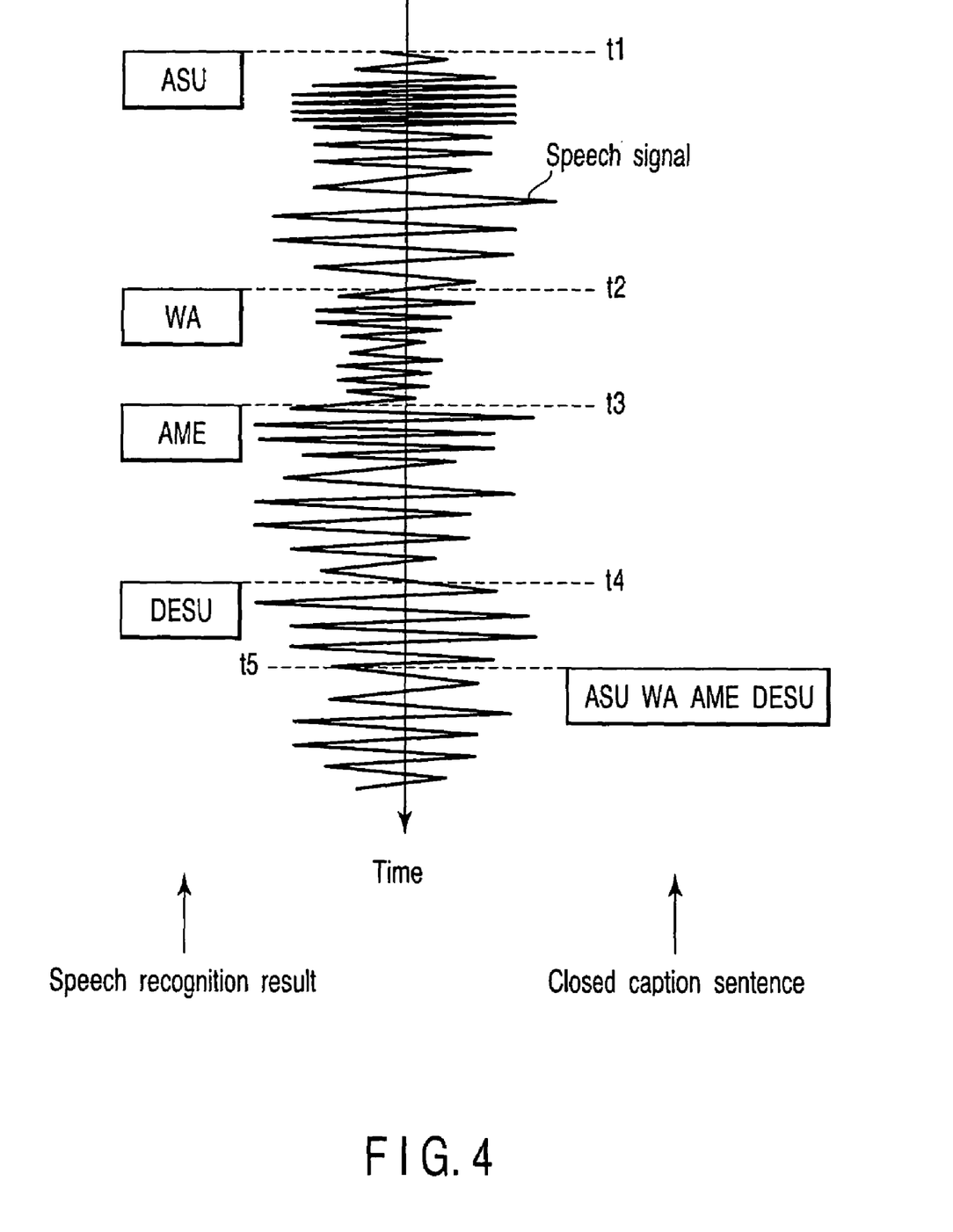
FIG. 4 is a diagram of a concrete example for speech recognition and closed caption analysis.

Concretely, the speech recognition module 141 derives four speech contents of, for example, "ASU", "WA", "AME", "DESU" as shown in FIG. 4, from speech data representing the speech "ASU WA AME DESU". The speech recognition module 141 acquires times t1, t2, t3, t4 shown in FIG. 4 as speech timing information of the speech contents.

The closed caption analysis module 142 analyzes the closed caption information stored in the HDD 13 in step ST2. The closed caption analysis module 142 decodes the closed caption information stored in the HDD 13 and acquires the text data representing a closed caption sentence. The closed caption analysis module 142 subjects the text data to a morphological analysis to derive reading information of each morpheme and part-of-speech information which are included in the text data.

The closed caption analysis module 142 acquires presentation timing information representing a presentation timing of the closed caption sentence expressed by the text data. The presentation timing of the closed caption sentence assumes a timing at which the closed caption information is derived. Accordingly, the closed caption analysis module 142 sets a relative time defining, as a reference time, the position of the NTSC signal at which the closed caption information is multiplexed, for example, the head of the program, to presentation timing information.

When the presentation timing of the closed caption sentence is designated by control information superposed on the NTSC signal, this control information can be used as presentation timing information.

FIG. 4 shows an example that the text data representing the closed caption sentence of "ASU WA AME DESU" is received after the speech of "ASU WA AME DESU". In this case, the closed caption analysis module 142 acquires a time t5 indicating an arrival timing of the text data as presentation timing information, as well as the text data of "ASU WA AME DESU". The closed caption analysis module 142 derives reading information of four morphemes of "ASU", "WA", "AME", "DESU" and part-of-speech information from the text data.

In step ST3, the agreement search module 143 searches for an agreement between the character string expressing one or more speech contents which are acquired by the speech recognition module 141 and the character string represented by the text data acquired by the closed caption analysis module 142.

When the speech contents and the text data do not agree with each other due to a difference between hiragana notation and kanji notation and so on, the agreement search unit 143 compares data of the next candidate for speech recognition and pronunciation data with the text data and the reading data acquired by the morphological analysis. The agreement search module 143 performs not only comparison between the speech contents and the text data that are identical in the speech timing and the presentation timing, but also comparison between the speech contents and the text data that are deviated in timing from each other in a fixed range.

In the example of FIG. 4, the character string representing the speech contents and the character string representing the text data include a character string of "ASU WA AME DESU" together. Such a character string is detected by the agreement search module 143. In performing a character string agreement search, use of various morphological information, for example, part-of-speech information permits more precise agreement.

In step ST4, the agreement search module 143 ensures whether an agreed character string is found by the search. If the agreed character string is found, the process advances to step ST5.

In step ST5, the text data corresponding to the found character string, the morpheme information of this text data, the presentation timing information, and the speech timing information of each speech content including the found character string are input to the deviation quantity determination module 144 from the agreement search module 143. In step ST5, the deviation quantity determination module 144 calculates a time difference between the speech time of the head indicated by the speech timing information and the presentation time indicated by the presentation timing information, and determines it as a deviation quantity of the closed caption sentence indicated by the text data with respect to the speech timing.

The deviation quantity determination module 144 determines a deviation quantity based on a time difference between the speech time indicated by the speech timing information of agreed speech contents and the presentation time indicated by the presentation timing information in regard to each of morphemes included in the text data.

In the example of FIG. 4, the speech times indicated by the speech timing information of speech contents agreeing with the closed caption sentence "ASU WA AME DESU" are t1, t2, t3, t4. Because the head is t1, the deviation quantity determination module 144 determines that the deviation quantity of the closed caption sentence expressing "ASU WA AME DESU" is [t5-t1]. The deviation quantity determination module 144 determines deviation quantities of the morphemes of "ASU", "WA", "AME", "DESU" as [t5-t1], [t5-t2], [t5-t3], [t5-t4], respectively.

In step ST6, the text data, the morpheme information, the presentation timing information, and the deviation quantity determined on the text data and morpheme information are input from the deviation quantity determination module 144 to the deviation information generation module 145. The deviation information generation module 145 corresponds the text data, the presentation timing information and the deviation quantity to each other, and generates deviation information obtained by corresponding the morpheme information to the deviation quantity. This deviation information is stored in the deviation information storage unit 15.

In step ST7, the morpheme information, the presentation timing information, and the deviation quantity determined on the morpheme information are input to the meta data generation module 146 from the deviation quantity determination module 144. The meta data generation module 146 ensures whether a morpheme according to a predetermined meta registration condition exists in the morphemes represented by the input morpheme information. The meta registration condition may be arbitrary, but it may be, for example, "nouns". If an appropriate morpheme exists, the process advances to step ST8.

In step ST8, the meta data generation module 146 generates the meta data by corresponding the morpheme matching the meta registration condition to the presentation timing information and the deviation quantity of the morpheme with respect to the presentation timing information, and stores the meta data in the meta data memory 16.

If the closed caption deviation quantity determination unit 14 completes step ST8, the process returns to step ST3. If there is no morpheme matching the meta registration condition, the closed caption deviation quantity determination unit 14 passes step ST8, and returns the process to step ST3. The closed caption deviation quantity determination unit 14 repeats steps ST3-ST8 till it is determined that no agreed character string is found in step ST4. If it is determined that no agreed character string is found in step ST4, the closed caption deviation quantity determination unit 14 finishes the process.

When the program recorded on the HDD 13 is played back, the closed caption signal correction unit 18 corrects the closed caption information included in the NTSC signal output from the playback controller 17 referring to the deviation information stored in the deviation information storage unit 15.

The closed caption synthesis unit 19 synthesizes the closed caption corresponding to the closed caption information output from the playback controller with the video signal output from the playback controller 17. In this time, the closed caption synthesis unit 19 deviates a synthesis timing of the closed caption information with respect to the video signal, referring to the deviation information stored in the information storage unit 15.

Figure 5:
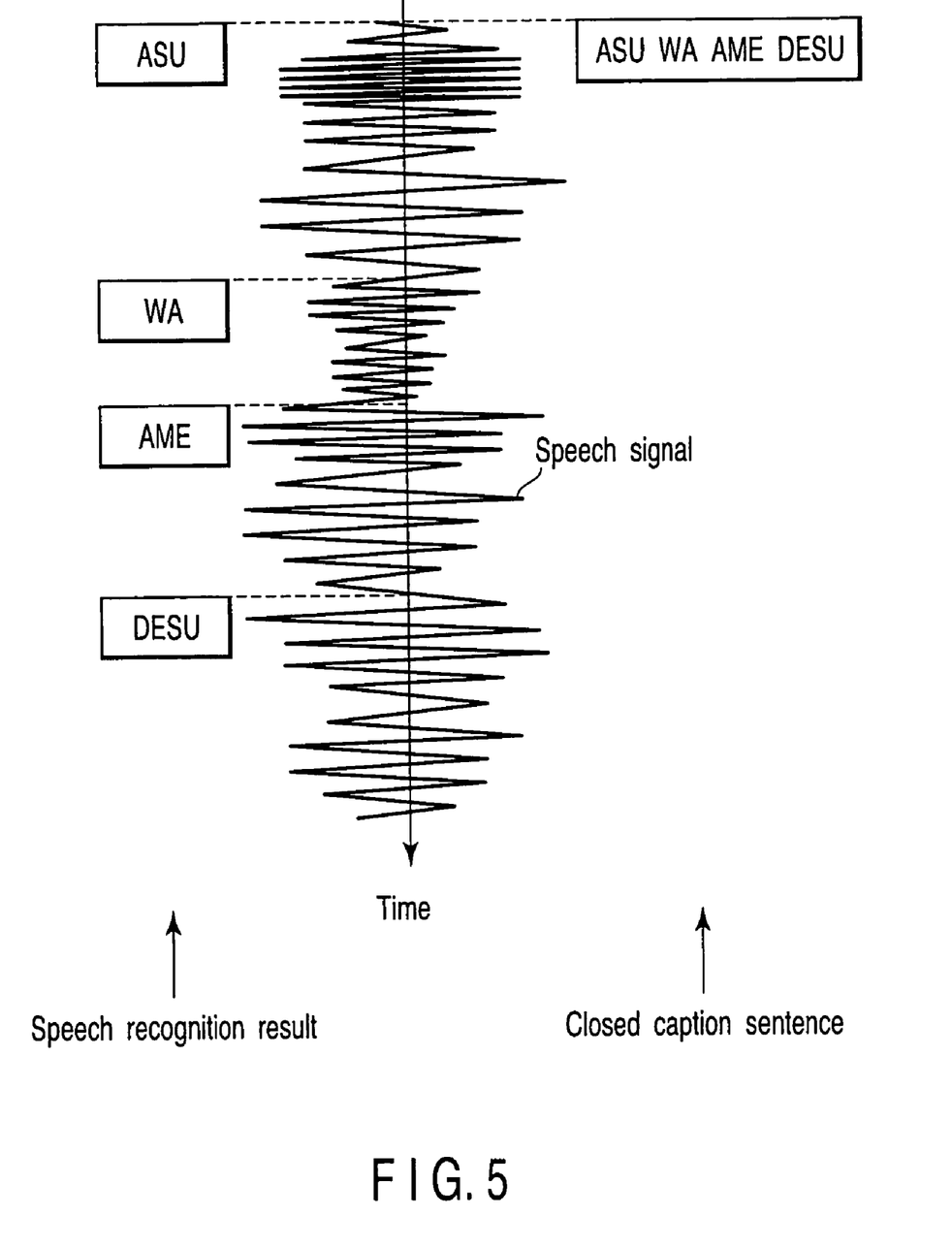
FIG. 5 is a diagram showing an example of correction of a presentation timing of a closed caption.

The closed caption signal correction unit 18 and the closed caption synthesis unit 19 each have four compensation modes. In the first compensation mode, the closed caption signal correction unit 18 and the closed caption synthesis unit 19 decreases the deviation quantity of the closed caption sentence to correct the closed caption signal to approximate the presentation timing of the closed caption to the timing of the head of the agreed speech. For example, the presentation timing of the closed caption shown in FIG. 4 is corrected to a presentation timing as shown in FIG. 5.

Figure 6:
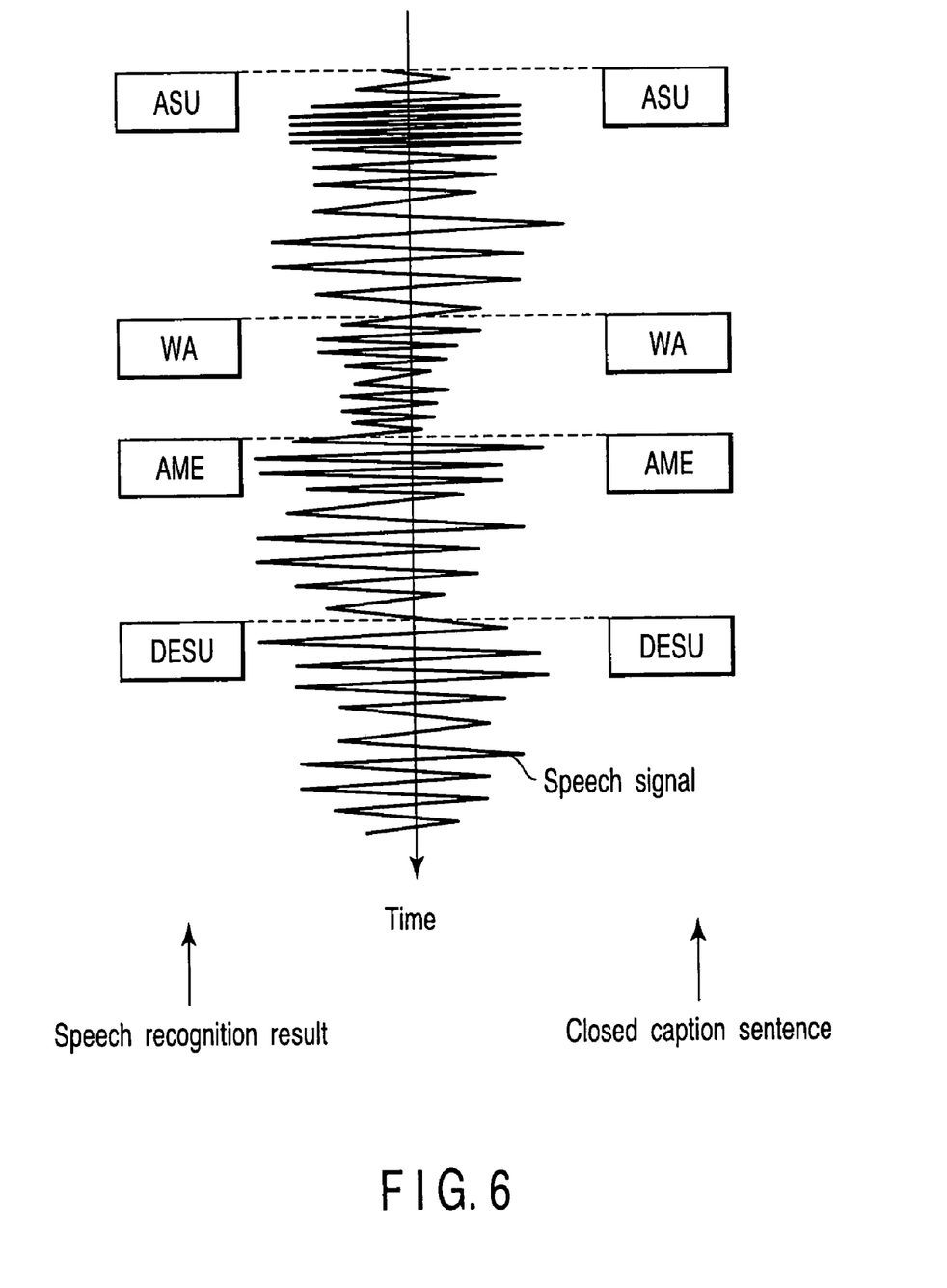
FIG. 6 is a diagram showing an example of correction of a presentation timing of a closed caption.

In the second compensation mode, the closed caption signal correction unit 18 and the closed caption synthesis unit 19 decreases the deviation quantity included in the closed caption sentence every morpheme to correct the closed caption signal to approximate the speech timing of the agreed morpheme to the presentation timing of each morpheme. For example, the presentation timing of the closed caption shown in FIG. 4 is corrected to the presentation timing as shown in FIG. 6.

In the third compensation mode, the closed caption signal correction unit 18 and the closed caption synthesis unit 19 correct the closed caption signal to set the presentation timing of the closed caption to a timing deviated by a given time from the timing of the head of the agreed speech. For example, the presentation timing of the closed caption is again set to a timing further deviated by a give time from the state of FIG. 5. In this time, the given time is determined according to a predefined rule such as "present only a noun at three seconds late".

In the fourth compensation mode, the closed caption signal correction unit 18 and the closed caption synthesis unit 19 correct the closed caption signal to set the presentation timing of each morpheme of the closed caption to a timing deviated by a given time from the speaking timing of the agreed morpheme. For example, the presentation timing of the closed caption is again set to a timing further deviated by a given time from the status of FIG. 6. In this time, the given time is determined according to a predefined rule such as "present only a noun at three seconds late".

According to the present embodiment as described above, the deviation quantity of the presentation timing of the closed caption with respect to the speech timing can be determined.

According to the present embodiment, the closed caption presentation can be realized at an appropriate timing by performing compensation of the closed caption signal and adjustment of a synthesis timing of the closed caption to decrease the deviation of the presentation timing of the closed caption with respect to the speech timing in consideration with the determined deviation quantity.

According to the present embodiment, the closed caption presentation can be realized in a uniform deviation by performing compensation of the closed caption signal or adjustment of a synthesis timing of the closed caption to set the deviation of the presentation timing of the closed caption with respect to the speech timing at a constant time, in consideration with the determined deviation quality. This is convenient for cases, for example, to train a listening comprehension of a foreign language by a foreign language program.

According to the present embodiment, the meta data which reflects the determined deviation quantity is generated. Consequently, it is possible to identify the part of an appropriate program that a closed caption including a certain word and phrase should be presented by referring to the meta data. For this reason, if, for example, the playback controller 17 uses this meta data for searching for a playback start point, it is possible to locate the start of the program appropriately.

Selection and presentation of the word and phrase that may be more important than the meta data is a help to understand the program information. For example, providing such a keyword at the time of a fast-forward playback can provide various usages to make it possible to do a fast-forward while confirming the contents.

According to the present embodiment, since a morpheme to register with meta data is only one according with a morpheme included in the speech contents, the important word and phrase shown in both of the speech and the closed caption are extracted to generate meta data. Therefore, it is possible to generate the appropriate meta data including no meaningless information.

This embodiment permits the following various kinds of modifications.

The closed caption deviation quantity determination unit 14 may be realized as an independent device, and circulated independently. The closed caption deviation quantity determination unit 14 does not need to include the deviation information generation module 145 and the meta data generation module 146. In this case, the deviation quantity determined by the deviation quantity determination module 144 is output to an external computer to use the determined deviation quantity with the computer.

The deviation information stored in the deviation information storage unit 15 or the meta data stored in the meta data memory 16 may be output to an external computer to use it with the computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A closed caption signal receiving apparatus to receive a television signal including a speech signal and a closed caption signal, the apparatus comprising:

a television receiver unit configured to receive a television signal including a speech signal and a closed caption signal;

a speech recognition unit configured to subject speech information to speech recognition to derive speech contents including notation data, pronunciation data and various morpheme information, the speech recognition unit including a pronunciation information estimation module to estimate the pronunciation information, and estimating the speech contents with linguistic meaning based on the pronunciation information;

a speech timing detecting unit configured to detect a speech timing of the speech contents;

a closed caption contents acquisition unit configured to acquire closed caption contents from the closed caption signal associated with the speech signal;

a presentation timing detecting unit configured to detect a presentation timing of the closed caption contents;

an agreement detecting unit configured to detect an agreement between the speech contents and the closed caption contents; and a time difference calculating unit configured to calculate a time difference between the speech timing and the presentation timing that are detected on the speech contents and the closed caption contents that agree with each other, respectively.

2. The apparatus according to claim 1, which further includes a word and phrase extraction unit configured to extract a word and phrase from the closed caption contents; and a meta data generating unit configured to generate meta data including the word and phrase, and timing information, which reflects the time difference and the presentation timing detected on the closed caption contents including the word and phrase.

3. The apparatus according to claim 2 wherein the word and phrase extraction unit is configured to extract the word and phrase from the closed caption contents agreeing with the speech contents.

4. The apparatus according to claim 1, which further includes a closed caption correction unit configured to correct the closed caption signal to decrease the time difference.

5. The apparatus according to claim 1, which further includes a closed caption correction unit configured to correct the closed caption signal to match the time difference with a predefined time difference.

6. The apparatus according to claim 1, which further includes a closed caption synthesis unit configured to synthesize the closed caption contents of the closed caption with a video image of the video signal synchronized with the speech signal, while shifting at least one of the speech timing and the presentation timing to decrease the time difference.

7. The apparatus according to claim 1, which further includes a closed caption synthesis unit configured to synthesize the closed caption contents of the closed caption with a video image of the video signal synchronized with the speech signal, while shifting at least one of the speech timing and the presentation timing to match the time difference with a predefined time difference.

8. The apparatus according to claim 1, which is built into a hard disk recorder including a television receiver to receive television broadcasting and a hard disk to store the speech signal and closed caption signal of the television broadcasting.

9. A method for receiving a television signal including a closed caption signal, comprising:

receiving a television signal including a speech signal and a closed caption signal;

subjecting speech information to speech recognition to derive speech contents including notation data, pronunciation data and various morpheme information, the speech recognition including estimating the pronunciation data, and estimating the speech contents with linguistic meaning based on the pronunciation information;

detecting a speech timing of the speech contents;

deriving closed caption contents from a closed caption signal associated with the speech signal;

detecting a presentation timing of the closed caption contents;

detecting agreement between the speech contents and the closed caption contents;

calculating a time difference between the speech timing and the presentation timing that are detected on the speech contents and the closed caption contents that agree with each other, respectively.

10. The method according to claim 9, which further includes extracting a word and phrase from the closed caption contents, and generating meta data including the word and phrase, and timing information, which reflects the time difference and the presentation timing detected on the closed caption contents including the word and phrase.

11. The method according to claim 9, which further includes compensating the closed caption signal to decrease the time difference.

12. The method according to claim 9, which further includes compensating the closed caption signal to match the time difference with a predetermined normal time difference.

13. The method according to claim 9, which further includes synthesizing the closed caption contents of the closed caption with a video image of the video signal synchronized with the speech signal, while shifting at least one of the speech timing and the presentation timing to decrease the time difference.

14. The method according to claim 9, which further includes synthesizing the closed caption contents of the closed caption with a video image of the video signal synchronized with the speech signal, while shifting at least one of the speech timing and the presentation timing to match the time difference with a predefined time difference.

15. The method according to claim 9, using the speech signal and closed caption signal of the television broadcasting.

16. A computer readable medium encoded with computer program instructions for receiving a television signal including a closed caption signal, which when executed by a computer results in performance of steps comprising:

receiving a television signal including a speech signal and a closed caption signal;

subjecting speech information in the speech signal to speech recognition to derive speech contents including notation data, pronunciation data and various morpheme information, the speech recognition including estimating the pronunciation data, and estimating the speech contents with linguistic meaning based on the pronunciation information;

detecting a speech timing of the speech contents;

acquiring closed caption contents from a closed caption signal associated with the speech signal;

detecting a presentation timing of the closed caption contents;

detecting agreement between the speech contents and the closed caption contents;

calculating a time difference between the speech timing and the presentation timing that are detected on the speech contents and the closed caption contents that agree with each other, respectively.

17. The computer readable medium according to claim 16, wherein said steps further comprise extracting a word and phrase from the closed caption contents, and generating meta data including the word and phrase, and timing information, which reflects the time difference and the presentation timing detected on the closed caption contents including the word and phrase.

18. The computer readable medium according to claim 16, wherein said steps further comprise using the speech signal and closed caption signal of the television broadcasting.

* * * * *